Jan. 15, 1952  F. C. FRARY  2,582,376
PROCESS OF PRODUCING GALLIUM
Filed April 5, 1947
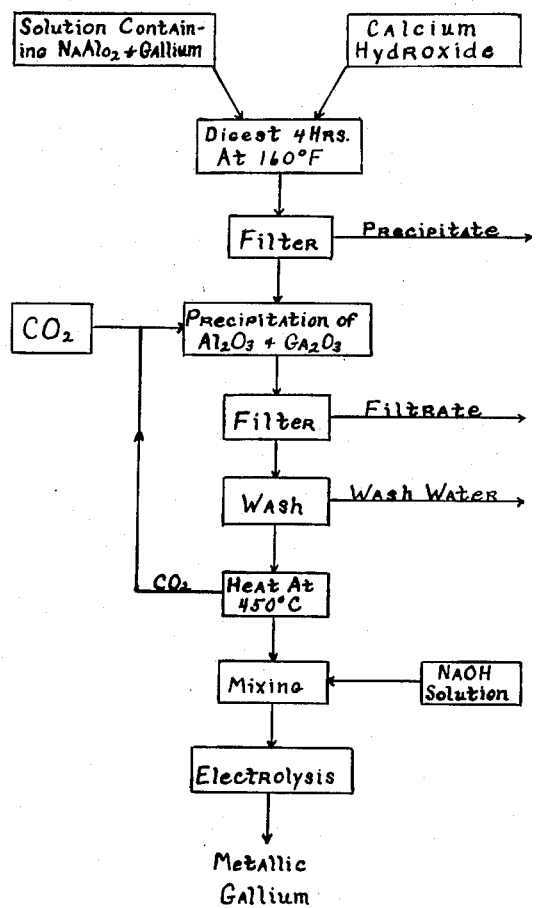
INVENTOR.
Francis C. Frary
BY Edward B. Foote
ATTORNEY Patented Jan. 15, 1952

2,582,376

UNITED STATES PATENT OFFICE 2,582,376

PROCESS OF PRODUCING GALLIUM

Francis C. Frary, Oakmont, Pa., assignor to Aluminum Company of America, Pittsburgh, Pa., a corporation of Pennsylvania Application April 5, 1947, Serial No. 739,538

15 Claims. (Cl. 204—105)

This invention relates to the production of metallic gallium, and relates particularly to the extraction of gallium from materials containing both gallium oxide and alumina.

Gallium oxide frequently occurs associated with alumina in natural minerals, with the amount of alumina greatly exceeding the amount of gallium oxide. Reported analyses vary from less than 0.001 per cent to about 0.01 per cent of gallium oxide in many minerals containing alumina and substantial amounts of silica, iron oxide, titanium oxide, and various other impurities. In view of the small percentage of gallium oxide in such materials, and the difficulties involved in separating it from other substances present, the recovery of the gallium oxide and its conversion to gallium have been exceedingly complicated and expensive.

It is known to extract gallium from minerals such as those mentioned above by various processes that involve the production of a solution containing an alkali metal aluminate and gallium values dissolved therein. For example, in certain cases such a solution can be produced by treating the mineral with a hot aqueous solution of an alkali metal hydroxide, such as a 20% solution of sodium or potassium hydroxide. Because of the small proportion of gallium oxide in the raw material, and the much larger amount of alumina present, such solutions ordinarily contain a very large percentage of alkali metal aluminate in proportion to that of gallium values. The separation of the small amount of gallium values from the alumina values of the solution, to permit extraction of gallium therefrom has not been economically feasible, and as a result the production of gallium by processes involving solutions of the type mentioned above has been impractical.

It has been stated in the literature ("Das Gallium" by Einecke, page 92, published in 1944 by J. W. Edwards) that gallium oxide and hydroxide, dissolved in alkali metal hydroxide solutions, form alkali metal gallates which are analogous to the corresponding aluminates. Since there is, however, some uncertainty about their constitution, I have preferred to designate such an alkaline solution merely as one containing dissolved gallium, thus making no assumptions as to the actual chemical compound of gallium present in the solution.

It is an object of this invention to provide a method of concentrating gallium dissolved in a solution containing alkali metal aluminate. It is a further object of this invention to provide a process by which metallic gallium can be produced economically from materials containing alumina and gallium oxide, when the gallium oxide is extracted from such materials by means of an alkali metal hydroxide solution.

In accordance with this invention, gallium is produced by a process which involves treating a solution containing alkali metal aluminate with gallium dissolved therein, to remove alumina from the solution as calcium aluminate, while leaving the gallium in solution. Thereafter a more concentrated solution of the gallium is produced, and metallic gallium is extracted from it. The solution treated as described may be one produced by known processes specifically for use in carrying out this invention, or it may be a solution produced in the course of other operations, such as alkaline processes for producing alumina from bauxite and the like.

I have found that alumina can be readily removed from alkaline solutions containing dissolved alkali metal aluminate and gallium, without precipitating gallium values, by adding to the solution a soluble calcium compound which results in the precipitation of calcium aluminate in the solution. In carrying out my invention, alumina is precipitated from the solution as calcium aluminate by that procedure, while leaving the gallium in the solution. The precipitated calcium aluminate can then be removed from the solution, as by filtration or by sedimentation and decantation, after which it may be washed with water, if desired, to recover any small portion of the gallium-containing solution entrapped in the precipitate.

The amount of the calcium compound used in any given instance depends on the particular amount of alumina to be removed from the solution as calcium aluminate, and on the amount of materials other than the alkali metal aluminate present in the solution to react with the calcium compound. The amount which should be employed in connection with any particular solution can be readily determined by analysis of a sample of the solution. For best results the amount used should be slightly in excess of that theoretically required to insolubilize the desired amount of the alumina values of the solution. Any desired proportion of the alumina values can be precipitated as calcium aluminate as described above, without also precipitating gallium values; ordinarily it is desirable to precipitate at least the major portion of the alumina content of the solution. Preferably the solution is kept warm during precipitation of the calcium aluminate, a temperature of at least 100° F. being desirable.

After removal of alumina from the solution as described, a more concentrated solution of the dissolved gallium is produced, from which gallium is extracted. The solution from which calcium aluminate has been precipitated may contain various impurities which make it unsuitable to merely concentrate that solution by evaporation and use it in the extraction of metallic gallium. In that case, gallium oxide is precipitated from that solution and re-dissolved in another solution—which may be either acid or alkaline—to produce the more concentrated solution mentioned. Metallic gallium can then be electro-deposited from the latter solution by previously known procedures.

Precipitation of gallium oxide from the solution remaining after the calcium aluminate precipitation step can be effected by adding the proper amount of an acidic material (i. e., an acid or an acid salt) to that solution. The precipitate is more readily filterable if the solution is kept warm—above 100° F.—during precipitation. The precipitation of gallium oxide is facilitated if alumina is co-precipitated with the gallium oxide, as described in the patent application of Ralph W. Brown, entitled "Process for Treating Alkali Metal Aluminate Solutions," Serial No. 740,981, filed April 11, 1947. When employing carbon dioxide as the acidic material to coprecipitate the alumina and gallium oxide, it is advantageous to heat the precipitate at a temperature of at least 350° C.—as is also described in the above-mentioned application of Ralph W. Brown—to facilitate subsequent dissolving of the co-precipitated alumina and gallium oxide to produce the solution from which metallic gallium is extracted.

In the preferred form of my invention, lime (either quick lime or hydrated lime) is the calcium compound employed to precipitate alumina as calcium aluminate from the alkali metal aluminate solution, and carbon dioxide (in the form of gas, carbonic acid solution, or sodium bicarbonate) is used as the acidic material in the above-described step in which gallium oxide is precipitated. Not only are those precipitants cheap and plentiful, but in addition their use permits the original alkali metal values of the alkali metal aluminate solution to be carried through the process and ultimately left in solution in the form of alkali metal carbonate, which can be easily and cheaply converted to alkali metal hydroxide by adding lime to the solution. In this manner alkali metal hydroxide solution can be produced for use in dissolving additional gallium oxide from further raw material, the dissolved gallium being then concentrated and converted to metallic gallium, as described previously. If desired, prior to concentrating the gallium, a portion of the alumina values in the solution can be precipitated as aluminum hydroxide by well-known processes.

In the accompanying flow diagram is illustrated a procedure employed for recovering gallium in accordance with this invention from a solution formed by treating bauxite with a hot sodium hydroxide solution. The solution contained about 0.13 gram per liter of gallium oxide, 45 grams per liter of alumina, 110 grams per liter of sodium hydroxide, 115 grams per liter of sodium carbonate (resulting from the procedure used in forming the original sodium hydroxide solution), and minor amounts of various other impurities. As indicated in the flow diagram, the solution was mixed with 178.5 grams per liter of hydrated lime and heated at about 160° F. for four hours, after which the resulting solution was filtered to remove the calcium aluminate and calcium carbonate formed by reaction of the lime with sodium aluminate and sodium carbonate. The filtered solution, containing about 2.8 grams per liter of alumina, 0.13 gram per liter of gallium oxide, and 142 grams per liter of sodium hydroxide, and having a pH of 13.4, was then gassed rapidly with carbon dioxide, while maintained at a temperature of about 135° F., until it had a pH of 9, thereby co-precipitating alumina and gallium oxide in a hydrated form.

The precipitate, after being filtered from the solution and washed thoroughly with water, contained (by weight) 35.49 per cent of alumina, 1.0 per cent of gallium oxide, 24 per cent of carbon dioxide, and 29.63 per cent of soda calculated as $Na_2O$, plus water and minor impurities. It was then heated at 450° C. for four hours, in which operation part of the carbon dioxide was driven off from the precipitate. The product contained 1.2 per cent of gallium oxide, 43.5 per cent of alumina, and 17.14 per cent of carbon dioxide, the remainder being soda, water, and impurities.

It was then dissolved in a 14 per cent caustic soda solution to produce an aqueous solution containing 280 grams per liter of the calcined precipitate. The resulting solution was used as the electrolyte in an electrolytic cell containing a stainless steel anode and a stainless steel cathode which dipped into the electrolyte. The cell was operated at a cathode current density of 5 amperes per square inch and 10 volts, and a temperature of 175° F., whereupon gallium was deposited on the cathode. The electrodeposited metal contained about 97 per cent gallium, plus small amounts of zinc, lead, and iron.

I claim:

1. The method of producing a solution containing dissolved gallium from a solution containing alkali metal aluminate with gallium dissolved therein, comprising insolubilizing at least the major portion of the alumina values of the said solution by adding to that solution a calcium compound which will form precipitated calcium aluminate in the solution by reaction, thereafter precipitating gallium oxide from the solution, and subsequently dissolving the precipitated gallium oxide in a solvent therefor, the concentration of dissolved gallium in the last-mentioned solution being greater than the concentration of dissolved gallium in the first-mentioned solution.

2. The process of producing gallium oxide from an alkali metal aluminate solution with gallium dissolved therein, comprising the steps of insolubilizing at least the major portion of the alumina values of the said first-mentioned solution as calcium aluminate by adding to that solution a calcium compound which will form precipitated calcium aluminate in the solution by reaction, thereafter removing from the solution the precipitated calcium aluminate, and subsequently precipitating alumina and gallium oxide from the solution by introducing an acidic material thereinto.

3. The process of producing a gallium-bearing solution from an alkali metal aluminate solution with gallium dissolved therein, comprising the steps of insolubilizing at least the major portion of the alumina values of the said alkali metal aluminate solution by adding to that solution a calcium compound which will form precipitated calcium aluminate in the solution by reaction, thereafter removing from the solution the precipitated calcium aluminate, subsequently precipitating gallium oxide from the solution, and thereafter dissolving the precipitated gallium oxide in a solvent therefor.

4. A process according to claim 2 in which lime is the calcium compound added to the solution.

5. The process of recovering gallium from a solution containing alkali metal aluminate with gallium dissolved therein, comprising insolubilizing at least the major portion of the alumina values of the said solution by adding to the solution a calcium compound which will form precipitated calcium aluminate in the solution by reaction, subsequently producing a more concentrated solution of the dissolved gallium of the resultant solution, and thereafter electrodepositing metallic gallium from the said more concentrated solution.

6. The process of recovering gallium from a solution containing alkali metal aluminate with gallium dissolved therein, comprising insolubilizing at least the major portion of the alumina values of the said solution by adding to the solution a calcium compound which will form precipitated calcium aluminate in the solution by reaction, subsequently precipitating gallium oxide from the resultant solution, dissolving the precipitated gallium oxide in a solvent therefor, and electrodepositing metallic gallium from the latter solution.

7. The process of recovering gallium from a solution containing alkali metal aluminate with gallium dissolved therein, comprising insolubilizing at least the major portion of the alumina values of the said solution by adding lime to the solution, subsequently precipitating gallium oxide from the solution by adding carbon dioxide thereto, dissolving the precipitated gallium oxide in a solvent therefor, and electrodepositing metallic gallium from the latter solution.

8. The process of recovering gallium from material containing alumina and gallium oxide, comprising the steps of dissolving alumina and gallium oxide from such material in a sodium hydroxide solution, insolubilizing at least the major portion of the alumina values of the resultant solution by adding lime thereto, subsequently precipitating gallium oxide from the solution by adding carbon dioxide thereto, thereby converting sodium values in the solution to sodium carbonate, dissolving the precipitated gallium oxide in a solvent therefor, electrodepositing metallic gallium from the latter solution, converting sodium carbonate in the solution resulting from the said third step to sodium hydroxide, and dissolving additional alumina and gallium oxide from further material containing those substances by means of the resultant sodium hydroxide solution.

9. The process of recovering metallic gallium from an alkali metal aluminate solution with gallium dissolved therein, comprising the steps of decreasing the molecular ratio of dissolved alumina values to dissolved gallium in the said solution by insolubilizing at least the major portion of the said alumina values by adding to the solution a calcium compound which will form precipitated calcium aluminate in the solution by reaction, subsequently producing a more concentrated solution of the dissolved gallium, and thereafter electrodepositing metallic gallium from the latter solution.

10. In the process of recovering gallium from an alkali metal aluminate solution with gallium dissolved therein, which includes the steps of producing another solution having gallium from the first-mentioned solution dissolved therein, and producing metallic gallium from the solution thus produced, the steps of insolubilizing at least the major portion of the alumina values of the first-mentioned solution, prior to the said first-mentioned step, by adding to that solution a calcium compound that will form calcium aluminate in that solution by reaction, and thereafter removing the precipitated calcium aluminate from the resultant solution.

11. In the process of recovering gallium from an alkali metal aluminate solution with gallium dissolved therein, which includes the steps of precipitating gallium oxide from the solution, dissolving the precipitated gallium oxide in a solvent therefor, and producing metallic gallium from the solution thus produced, the steps of insolubilizing at least the major portion of the alumina values of the first-mentioned solution, prior to the said first-mentioned step, by adding to that solution a calcium compound that will form calcium aluminate in that solution by reaction, and thereafter removing the precipitated calcium aluminate from the resultant solution.

12. The process of recovering gallium from an alkali metal aluminate solution having gallium dissolved therein, comprising adding sufficient lime to the solution to insolubilize at least the major portion of the alumina values of the solution as calcium aluminate, the solution being at a temperature of at least 100° F. during such insolubilizing of alumina, subsequently precipitating gallium oxide from the resultant solution by adding carbon dioxide thereto, dissolving the precipitated gallium oxide in a sodium hydroxide solution, and electrodepositing metallic gallium from the solution thus produced.

13. A method of producing a solution containing dissolved gallium from an alkali metal aluminate solution having gallium dissolved therein, comprising insolubilizing at least the major portion of the alumina values of the said solution by adding to that solution a calcium compound which will form precipitated calcium aluminate in the solution by reaction, thereafter precipitating gallium oxide from the solution, and subsequently dissolving the precipitated gallium oxide in a sodium hydroxide solution, the concentration of dissolved gallium in the last mentioned solution being greater than the concentration of dissolved gallium in the first-mentioned solution.

14. The process of recovering gallium from an alkali metal aluminate solution having gallium dissolved therein, comprising adding sufficient lime to the solution to insolubilize at least the major portion of the alumina values of the solution as calcium aluminate, subsequently precipitating gallium oxide from the resultant solution by adding carbon dioxide thereto, dissolving the precipitated gallium oxide in a sodium hydroxide solution, and electrodepositing metallic gallium from the solution thus produced.

15. A process according to claim 6 in which lime is the calcium compound added to the solution, and an aqueous sodium hydroxide solution is the solvent in which the precipitated gallium oxide is dissolved.

FRANCIS C. FRARY.

(References on following page)

REFERENCES CITED

The following references are of record in the file of this patent:

UNITED STATES PATENTS

| Number | Name | Date |
|---|---|---|
| 382,505 | Bayer | May 8, 1888 |
| 461,416 | Bradburn et al. | Oct. 20, 1891 |
| 515,895 | Bayer | Mar. 6, 1894 |
| 663,167 | Hall | Dec. 4, 1900 |
| 938,432 | Peffer | Oct. 26, 1909 |
| 941,799 | McCullough | Nov. 30, 1909 |
| 1,013,022 | Kendall | Dec. 26, 1911 |
| 1,855,455 | McCutchean | Apr. 26, 1932 |
| 2,248,826 | Seailles | July 8, 1941 |

FOREIGN PATENTS

| Number | Country | Date |
|---|---|---|
| 381,520 | Great Britain | Oct. 6, 1932 |
| 423,594 | Great Britain | Jan. 31, 1935 |

OTHER REFERENCES

A Text Book of Inorganic Chemistry, edited by Friend, vol. 4, Aluminum and its Cogeners, by Little, page 115.

J. W. Mellor: "A Comprehensive Treatise on Inorganic and Theoretical Chemistry," vol. V (1924), page 381.

U. S. Bureau of Mines Circular 6401, page 4, Gallium, Vanadium, Indium and Scandium, by Alice V. Petar, November 1930.

Caven and Lander, "Systematic Inorganic Chemistry," pages 158–160 (1932).